United States Patent
Beckerdite et al.

(10) Patent No.: US 6,589,621 B1
(45) Date of Patent: *Jul. 8, 2003

(54) THERMALLY STABLE POLYETHERAMINES

(75) Inventors: John M. Beckerdite, Lake Jackson, TX (US); Terry W. Glass, Richwood, TX (US); Joe F. Sanford, Lake Jackson, TX (US); David S. Wang, Taipei (TW); Jerry E. White, Lake Jackson, TX (US); Peter T. Keillor, III, Lake Jackson, TX (US); Thomas E. Moseman, Brazoria, TX (US)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 84 days.

(21) Appl. No.: 09/108,620

(22) Filed: Jul. 1, 1998

(51) Int. Cl.$^7$ .............................................. B29D 22/00
(52) U.S. Cl. .................. 428/36.92; 428/35.7; 528/101; 528/406
(58) Field of Search ................................. 528/101, 406; 428/35.7, 36.92

(56) References Cited

U.S. PATENT DOCUMENTS

| 4,612,156 A | | 9/1986 | Heinemeyer et al. ... 264/176 R |
| 4,663,216 A | * | 5/1987 | Toyoda et al. ............... 428/212 |
| 5,149,768 A | * | 9/1992 | White et al. .................... 528/89 |
| 5,275,853 A | * | 1/1994 | Silvis et al. ................ 428/35.4 |
| 5,464,924 A | | 11/1995 | Silvis et al. ................. 528/102 |
| 5,686,551 A | * | 11/1997 | White et al. ................. 528/101 |
| 5,834,078 A | * | 11/1998 | Cavitt et al. ............... 428/35.7 |
| 5,962,093 A | * | 10/1999 | White et al. ................ 428/35.2 |

FOREIGN PATENT DOCUMENTS

| DE | 2916356 A | * | 11/1980 |
| WO | 99 20673 A | | 4/1999 |

OTHER PUBLICATIONS

Plastics Engineering Handbook of the Society of the Plastics Industry, Inc., 4$^{th}$ Edition, p. 448.
I. Goodman, *Polyesters*, Encyclopedia of Polymer Science and Engineering, vol. 12, pp. 1–75 (1988 revision).

* cited by examiner

*Primary Examiner*—Sandra M. Nolan
(74) *Attorney, Agent, or Firm*—Nemia C. Damocles

(57) ABSTRACT

Compositions comprising a blend of an inorganic base, an organic base, a monofunctional organic nucleophile or a multifunctional organic nucleophile and a thermoplastic hydroxy-functionalized polyetheramine can be formed into films and laminate structures by using conventional extrusion techniques. Containers and other molded parts can be fabricated from the films or laminate structures by using conventional fabricating techniques for thermoplastic polymers such as compression molding, injection molding, extrusion, thermoforming, blow molding and solvent casting.

27 Claims, No Drawings

THERMALLY STABLE POLYETHERAMINES

BACKGROUND OF THE INVENTION

This invention relates to polyethers having pendant hydroxyl moieties. More particularly, this invention relates to hydroxy-functionalized polyetheramines or polyhydroxyaminoethers (PHAE).

Hydroxy-functionalized polyetheramines are known and are described, for example, in U.S. Pat. Nos. 5,275,853 and 5,464,924. These polyetheramines exhibit oxygen transmission rates of from 0.57 to 19 cm$^3$-mil/100 in$^2$-atm ($O_2$)-day, and are useful in the fabrication of barrier containers and films and as molding, extrusion and casting resins.

Hydroxy-functionalized polyetheramines can sometimes undergo cross-linking when fabricated at elevated temperatures. Modified, melt-stable polyetheramines, along with a process for their preparation, would clearly be desirable.

SUMMARY OF THE INVENTION

The present invention is, in a first aspect, a composition comprising a blend of an inorganic base, an organic base, a monofunctional organic nucleophile or a multifunctional organic nucleophile and a thermoplastic hydroxy-functionalized polyetheramine having the formula:

$$XCH_2\underset{R^1}{\overset{OH}{\overset{|}{C}}}CH_2OB\text{—}(OCH_2\underset{R^1}{\overset{OH}{\overset{|}{C}}}CH_2ACH_2\underset{R^1}{\overset{OH}{\overset{|}{C}}}CH_2OB)_n\text{—}OCH_2\underset{R^1}{\overset{OH}{\overset{|}{C}}}CH_2X$$

wherein each A is independently an amine moiety and each B is independently a divalent aromatic moiety; $R^1$ is hydrogen or a hydrocarbyl moiety; each X is independently a monovalent moiety; and n is a whole number from about 5 to about 1000.

In a second aspect, the present invention is a process for preparing a blend which comprises contacting an inorganic base, an organic base, a monofunctional organic nucleophile or a multifunctional organic nucleophile with a polyetheramine.

In a third aspect, the present invention is a laminate structure comprising one or more layers of an organic polymer and one or more layers of the composition of the first aspect.

In a fourth aspect, the present invention is an article fabricated from the composition of the first aspect or laminate structure thereof, and can be in the form of a molded or coextruded container, or an impermeable monolayer or multilayer film. The article is suitable for packaging oxygen-sensitive materials such as foodstuffs and medicines.

In a fifth aspect, the present invention is a solvent or waterborne coating prepared from the composition of the first aspect.

These hydroxy-functionalized polyetheramine blends are melt-stable thermoplastics and exhibit oxygen transmission rates below 5.0 cc-mil/100 in$^2$-atm-day.

In addition to their use as barrier containers, films, laminate structures and coatings, the compositions of this invention are also useful as molding, extrusion and casting resins.

DETAILED DESCRIPTION OF THE INVENTION

In preferred embodiments of the present invention, each A in the above formula is independently an amine moiety represented by any one of the formulas:

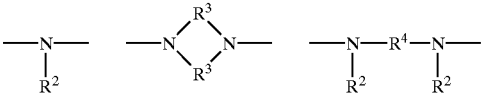

wherein R is independently a hydrocarbyl, heterohydrocarbyl, inertly-substituted hydrocarbyl or inertly-substituted heterohydrocarbyl moiety, wherein the substituent(s) is hydroxyl, cyano, halo, arlyloxy, alkylamido, arylamido, alkylcarbonyl, or arylcarbonyl; $R^3$ and $R^4$ are independently a hydrocarbylene, heterohydrocarbylene, inertly-substituted hydrocarbylene or inertly-substituted heterohydrocarbylene moiety, wherein the substituent(s) is hydroxyl, cyano, halo, arlyloxy, alkylamido, arylamido, alkylcarbonyl, or arylcarbonyl with ethylene and p-xylylene being most preferred; each X is independently hydrogen, a primary, secondary or tertiary amino moiety, a hydroxyl moiety, an alkyl, heteroalkyl, inertly-substituted alkyl or inertly-substituted heteroalkyl group, an aryl or inertly-substituted aryl group, an alkoxy or inertly-substituted alkoxy group; an aryloxy or inertly-substituted aryloxy group, an alkanethio or inertly-substituted alkanethio group; an arenethio or inertly-substituted arenethio group, wherein the substituent(s) is hydroxyl, cyano, halo, arlyloxy, alkylamido, arylamido, alkylcarbonyl, or arylcarbonyl; or is represented by any one of the formulas:

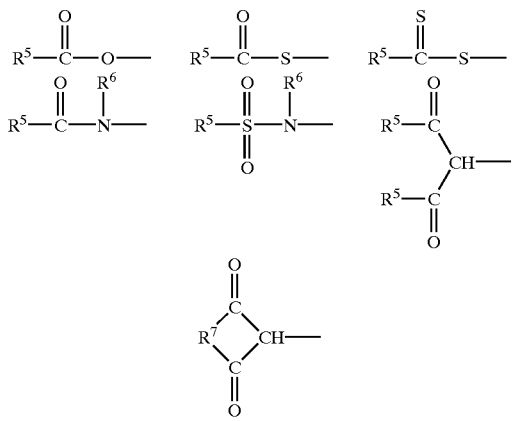

wherein $R^5$ is independently an alkyl or heteroalkyl, inertly-substituted alkyl or heteroalkyl, aryl or inertly-substituted aryl group, wherein the substituent(s) is cyano, halo, arlyloxy, alkylamido, arylamido, alkylcarbonyl, or arylcarbonyl; $R^6$ is independently hydrogen, an alkyl or heteroalkyl, inertly-substituted alkyl or heteroalkyl, aryl or inertly-substituted aryl group, wherein the substituent(s) is the same as that for $R^5$; and $R^7$ is an alkylene or heteroalkylene, inertly-substituted alkylene or heteroalkylene, arylene or inertly-substituted arylene moiety, wherein the substituent(s) is the same as that for $R^3$ and $R^4$.

In the more preferred embodiments of the present invention, X is 2-hydroxyethylamino, dimethylamino, diethylamino, piperadino, N-(2-hydroxyethyl)piperazino, methoxy, ethoxy, propoxy, 2-(methoxy)ethoxy, 2-(ethoxy)ethoxy, benzyloxy, phenyloxy, p-methylphenyloxy, p-methoxyphenoxy, 4-tert-butylphenyloxy, methylmercapto, ethylmercapto, propylmercapto, 2-(methoxy)ethylmercapto, 2-(ethoxy)ethylmercapto, benzylmercapto, 2,3-dihydroxypropylmercapto, phenylmercapto, p-methylphenylmercapto, acetate, benzoate, acetamido or benzenesulfonamido; $R^1$ is hydrogen or methyl; $R^2$ is methyl, ethyl, propyl, isopropyl, 2-hydroxyethyl, 3-hydroxypropyl, 2-hydroxypropyl, 2,3-dihydroxypropyl, 2-(acetamido)ethyl, benzyl, phenyl, p-methoxyphenyl, p-methylphenyl; $R^3$ is ethylene, 1,2-propylene or 1,2-butylene and $R^4$ is ethylene, 1,2-propylene or 1,2-butylene, propylene, butylene, hexamethylene, 1,4-xylylene, 1,3-xylylene, 1,4-phenylene, 1,3-phenylene or 1,2-phenylene; and B is 1,4-phenylene, 1,3-phenylene, 1,2-phenylene, methylenediphenylene, isopropylidenediphenylene, oxydiphenylene, thiodiphenylene, carbonyldiphenylene, diphenylflourene or a-methylstilbene or a combination thereof.

The hydroxy-functionalized polyetheramines employed in the present invention can be prepared by reacting a difunctional amine with a diglycidyl ether under conditions sufficient to cause the amine moieties to form a polymer backbone having amine linkages, ether linkages and pendant hydroxyl moieties. Residual epoxy end groups, should any remain, can optionally be reacted with a monofunctional nucleophile so that the isolated polyetheramine has no moieties capable of reacting with nucleophilic species.

As used herein, the term "diglycidyl ether" means the reaction product of an aromatic, aliphatic or poly(alkylene oxide) diol with epichlorohydrin.

The difunctional amines which can be employed in the practice of the present invention include the bis-secondary amines and primary amines. Suitable bis-secondary amines include piperazine and substituted piperazines, e.g., dimethylpiperazine and 2-methylamidopiperazine; bis(N-methylamino)benzene, 1,2-bis(N-methylamino)ethane, and N,N'-bis(2-hydroxyethyl)ethylenediamine. Preferred bis-secondary amines are piperazine, dimethylpiperazine, and 1,2-bis(N-methylamino)ethane. The most preferred bis-secondary amine is piperazine. Suitable primary amines include aniline and substituted anilines, e.g. 4-(methylamido)aniline, 4-methylaniline, 4-methoxyaniline, 4-tert-butylaniline, 3,4-dimethoxyaniline, 3,4-dimethyaniline; alkylamines, and substituted alkyl amines, e.g. butylamine and benzylamine; and alkanol amines; e.g. 2-aminoethanol and 1-aminopropan-2-ol. Preferred primary amines are aniline, 4-methoxyaniline, 4-tert-butylaniline, butylamine, and 2-aminoethanol. Most preferred primary amines are 4-methoxyaniline and 2-aminoethanol.

The diglycidyl ethers which can be employed in the practice of the present invention for preparing the polyetheramines include the diglycidyl ethers of the amide-containing bisphenols such as N,N'-bis(hydroxyphenyl)-alkylenedicarboxamides, N,N'-bis(hydroxyphenyl)arylene-dicarboxamides, bis(hydroxybenzamido)alkanes or bis(hydroxybenzamido)arenes, N-(hydroxyphenyl) hydroxybenzamides, 2,2-bis(hydroxyphenyl)acetamides, N,N'-bis(3-hydroxyphenyl)glutaramide, N,N'-bis(3-hydroxyphenyl)adipamide, 1,2-bis(4-hydroxybenzamido) ethane, 1,3-bis(4-hydroxybenzamide)benzene, N-(4-hydroxyphenyl)-4-hydroxybenzamide, and 2,2-bis(4-hydroxyphenyl)acetamide, 9,9-bis(4-hydroxyphenyl) fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4-bis(4-hydroxyphenyl)methane, α,α-bis(4-hydroxyphenyl) ethylbenzene, 2,6-dihydroxynaphthalene and 4,4'-isopropylidene bisphenol (bisphenol A). More preferred diglycidyl ethers are the diglycidyl ethers of 9,9-bis(4-hydroxyphenyl)fluorene, hydroquinone, resorcinol, 4,4'-sulfonyldiphenol, 4,4'-thiodiphenol, 4,4'-oxydiphenol, 4,4'-dihydroxybenzophenone, tetrabromoisopropylidenebisphenol, dihydroxy dinitrofluorenylidenediphenylene, 4,4'-biphenol, 4,4'-dihydroxybiphenylene oxide, bis(4-hydroxyphenyl) methane, α,α-bis(4-hydroxyphenyl)ethylbenzene, 2,6-dihydroxynaphthalene and 4,4'-isopropylidene bisphenol (bisphenol A). Most preferred diglycidyl ethers are the diglycidyl ethers of 4,4'-isopropylidene bisphenol (bisphenol A), 4,4'-sulfonyldiphenol, 4,4'-oxydiphenol, 4,4'-dihydroxybenzophenone, and 9,9-bis(4-hydroxyphenyl) fluorene.

The inorganic bases which can be employed in the practice of the present invention include potassium hydroxide, sodium hydroxide, ammonium hydroxide, calcium oxide, magnesium oxide and mixtures thereof.

The organic bases which can be employed in the practice of the present invention include triethylenediamine and 1,5-diazabicyclo(5.4.0)undec-7-ene.

The monofunctional organic nucleophiles which can be employed in the practice of the present invention include a monofunctional amine, a hydroxyarene, an aryloxide salt, a carboxylic acid, a carboxylic acid salt, a thiol or a thiolate salt. Preferably, the monofunctional amine is dimethylamine, diethylamine, bis(2-hydroxyethyl)amine, dipohenylamine, piperadine, N-(2-hydroxyethylpiperadine); the hydroxyarene is phenol, cresol, methoxyphenol, or 4-tert-butylphenol; the aryloxide salt is sodium or potassium phenate; the carboxylic acid salt is sodium acetate, potassium acetate, calcium acetate, copper (II) acetate, sodium propionate, potassium propionate, calcium propionate, sodium benzoate, potassium benzoate, sodium ethylhexanoate, potassium ethylhexanoate, or calcium ethylhexanoate; the thiol is 3-mercapto-1,2-propanediol or benzenethiol; and the thiolate salt is sodium or potassium benzenethiolate.

The multifunctional organic nucleophiles which can be employed in the practice of the present invention include a multifunctional amine, a multifunctional carboxylic acid, a multifunctional carboxylic acid salt, a multifunctional phenol, a multifunctional phenate salt, a multifunctional thiol, a multifunctional thiolate salt, an amino acid or an amino acid salt. The preferred multifunctional organic nucleophiles are ethylenediamine, propylenediamine, butylenediamine, diethylenetriamine, triethylenetetraamine, tetraethylenepentaamine, polyethyleneamine, citric acid, sodium or potassium citrate, glycine or sodium or potassium glycinate.

In general, the inorganic base, organic base, monofunctional organic nucleophile or multifunctional organic nucleophile is blended with the thermoplastic hydroxy-functionalized polyetheramines by conventional dry-blending methods using conventional means such as a barrel mixer, or a tumble mixer or by melt blending in an appropriate apparatus, such as a Banbury type internal mixer, rubber mill, single or twin screw extruder or compounder.

The inorganic base, organic base, monofunctional organic nucleophile or multifunctional organic nucleophile can also be co-dissolved with the thermoplastic hydroxy-functionalized polyetheramines in a suitable solvent and the solvent removed by evaporation. Examples of suitable solvents include 1-methyl-2-pyrrolidinone (NMP), and ethers or hydroxy ethers such as diglyme, triglyme, diethylene glycol ethyl ether, diethylene glycol methyl ether, dipropylene glycol methyl ether, propylene glycol phenyl ether, propylene glycol methyl ether and tripropylene glycol methyl ether.

Another suitable method of preparing the blends of the present invention comprises reacting a difunctional amine, a diglycidyl ether and optionally a monofunctional nucleophile and then blending the reaction product in situ with an inorganic base, an organic base or a mono- or multifunctional organic nucleophile in a solvent, in a molten state or in an extruder.

The amount of the inorganic base, organic base, monofunctional organic nucleophile or multifunctional organic nucleophile most advantageously blended with the hydroxy-functionalized polyether is dependent on a variety of factors including the specific polymers used in making the blends, as well as the desired properties of the products resulting from the blends. Typical amounts can range from about 0.1 to about 15 weight percent of the blend. Preferably, the inorganic base, organic base, monofunctional organic nucleophile or multifunctional organic nucleophile is used in an amount of from about 0.5 to about 10 weight percent, more preferably from about 0.5 to about 3.0 weight percent and, most preferably, from about 0.1 to about 2.0 weight percent of the blend.

Films prepared from the composition of the present invention generally have oxygen transmission rates (OTR) of from about 0.05 to about 1.0 cc/mil/100 in$^2$/atm/day, at 25° C. and 60 percent relative humidity (ASTM D-3985) and carbon dioxide transmission rates ($CO_2$TR) of from about 0.5 to about 4.0 cc-mil/100 in$^2$-atm-day, at 23° C. and 0 percent relative humidity.

Films and laminate structures can be formed from the composition of the present invention by using conventional extrusion techniques such as feedblock extrusion, multi-manifold die coextrusion or combinations of the two, or by solvent spraying or solution casting. Solution casting is a well known process and is described, for example, in the *Plastics Engineering Handbook* of the Society of the Plastics Industry, Inc., 4th Edition, page 448.

Containers and other molded parts can be fabricated from the films or laminate structures comprising the composition of the present invention by using conventional fabricating techniques for thermoplastic polymers such as compression molding, injection molding, extrusion, thermoforming, blow molding and solvent casting.

In general, laminate structures can be formed from the composition of the present invention by coextruding one or more layers of an organic polymer and one or more layers of the composition of the present invention, wherein the layer of the composition of the present invention is adhered to a contiguous organic polymer layer with or without an adhesive layer therebetween. Laminate structures also can be formed by co-injection of the composition of the present invention with an organic polymer; in some cases, preforms produced by such co-injection can be blow-molded into multilayer containers.

The laminate structure can be a three-layer laminate comprising a first outer layer of an organic polymer, a core layer of the composition of the present invention and a second outer layer of an organic polymer which is the same as or different from the organic polymer of the first outer layer.

The laminate structure can also be a three-layer laminate comprising a first outer layer of the composition of the present invention, a core layer of an organic polymer and a second outer layer of an organic polymer which is the same as or different from the organic polymer of the core layer.

The laminate structure can also be a three-layer laminate comprising a first outer layer of the composition of the present invention, a core layer of an organic polymer and a second outer layer of the composition of the present invention.

The laminate structure can of course comprise more than three layers, including, for example, five-layer structures comprising outer layers and an innerlayer of an organic polymer separated by two layers of the composition of the present invention.

Organic polymers which can be employed in the practice of the present invention for preparing the laminate structure include crystalline thermoplastic polyesters, such as polyethylene terephthalate (PET); polyamides, polyolefins, and polyolefins based on monovinyl aromatic monomers.

Polyesters and methods for their preparation are well known in the art and reference is made thereto for the purposes of this invention. For purposes of illustration and not limitation, reference is particularly made to pages 1–62 of Volume 12 of the *Encyclopedia of Polymer Science and Engineering,* 1988 revision, John Wiley & Sons.

Polyamides which can be employed in the practice of the present invention include the various grades of nylon, such as nylon-6, nylon-6,6 and nylon-12.

Polyolefins which can be employed in the practice of the present invention include, for example, low density polyethylene, linear low density polyethylene, very low density polyethylene, polypropylene, polybutene, ethylene/vinyl acetate copolymers, ethylene/propylene copolymers and ethylene/butene-1 copolymers.

Polyolefins based on monovinyl aromatic monomers which can be employed in the practice of the present invention include polystyrene, polymethylstyrene, styrene/methylstyrene or styrene/chlorostyrene copolymers.

Other organic polymers of the polyester or polyamide type can also be employed in the practice of the present invention for preparing the laminate structure. Such polymers include polyhexamethylene adipamide, polycaprolactone, polyhexamethylene sebacamide, polyethylene 2,6-naphthalate and polyethylene 1,5-naphthalate, polytetramethylene 1,2-dioxybenzoate and copolymers of ethylene terephthalate and ethylene isophthalate.

The thickness of each layer in the laminate structure is dependent on a number of factors, including the intended use, materials stored in the container, the length of storage prior to use and the specific composition employed in each layer of the laminate.

In general, the laminate structure will have a total thickness of from about 0.5 to about 500 mils, preferably from about 1.0 to about 250 mils; with the thickness of the hydroxy-functionalized polyetheramine layer(s) being from about 0.05 to about 100 mils, preferably from about 0.1 to about 50 mils; and the thickness of the polyester layer(s) being from about 0.45 to about 400 mils, preferably from about 0.9 to about 200 mils.

The composition of the present invention can also be prepared and fabricated into a shaped article by a reactive extrusion process wherein the reactants are fed into and reacted in an extruder using the conditions described in U.S. Pat. No. 4,612,156, which is incorporated herein by reference.

The following working examples are given to illustrate the invention and should not be construed as limiting its scope. Unless otherwise indicated, all parts and percentages are by weight.

EXAMPLE 1

A. Preparation of Polymer

A polyhydroxyaminoether (PHAE) polymer is prepared from the reaction of D.E.R.™ 332 (a liquid diglycidyl ether of bisphenol A) liquid epoxy resin (LER) and ethanolamine (MEA) in a Werner & Pfleiderer ZSK-30 extruder which has 30-mm twin screws with a length to diameter ratio of 47:1.

The extruder consists of 15 barrel sections with 9 heating zones. The temperature profile is zone 1 (barrel sections 1 and 2), 65° C.; zone 2 (barrel sections 3 and 4), 110° C.; zone 3 (barrel sections 5 and 6), 160° C.; zone 4 (barrel sections 7 and 8), 180° C.; zone 5 (barrel section 9), 190° C.; zone 6 (barrel sections 10 and 11), 190° C.; zones 7 and 8 (barrel sections 12 to 15), 200° C.; and zone 9 (extruder head), 200° C. The screw rotation speed is 130–150 rpm.

The LER and MEA are fed to barrel section 1 using Zenith HPB-5704 variable speed gear pumps with Max Model 213-300 positive displacement flow meters. The temperatures of the feed streams are measured with platinum RTD thermometers and density corrections applied to the gear pump set points to provide accurately controlled mass flow rates. The total reactant flow rate is controlled at 20 lbs./hr. with a molar ratio of LER to MEA of 0.971:1.

The diethanolamine (DEA), a cross-link suppressant additive, is fed to barrel section 14 at 2 wt. % of the blend using two 0.5 liter Isco Model LC-5000 syringe pumps synchronized such that one is injecting while the other is filling.

The resulting extrudate is processed through a gear pump, screen pack, strand die, water filled stand cooling trough, and strand chopper (pelletizer).

B. Thermal Stability Testing

The thermal stability of the PHAE polymer containing a cross-link suppressant is measured using a Haake Reocord 9000 torque measurement drive unit with a Haake Reomix 600 mixer chamber. The Reocord 9000 drive unit provides a torque measurement of the mixing of the polymer at controlled temperature and rotation speed.

The mixer chamber is preheated to 140° C. metal temperature, and the torque reading is zeroed with the rotation speed at 50 rpm. Sixty grams of the polymer are poured into the feed port of the chamber over a 3–4 minute period as the material is drawn into the chamber by the rotors. When all the polymer is charged, a ram is lowered into the feed port, closing the chamber. A slow nitrogen purge is blown across the top of the closed feed port to minimize exposure to oxygen. At 10 minutes from the start of the polymer addition, the torque reading has reached a steady state, and the metal temperature control set point is increased to 220° C. The start of isothermal torque readings (time equal to zero minutes) is set at the moment when the metal temperature reaches the 220° C. set point. The melt temperature and torque readings are recorded for 83 minutes. At 10 minutes from time zero the torque has decreased 10%, and at 30 minutes the torque has decreased 17%. The relative changes in the torque readings at 10 minutes and 30 minutes from time zero are recorded in Table 1.

EXAMPLES 2 AND 3

Two PHAE polymers are prepared and evaluated as in Example 1, except that the additives charged to the extruder are those described in Table 1. The relative changes in the torque readings at 10 minutes and 30 minutes from time zero are recorded in Table 1.

Comparative Example A

A. Preparation of Polymer

A PHAE polymer is produced from the reaction of LER and MEA as described in Example 1 except that the molar ratio of LER to MEA is 0.99:1 and no DEA is blended into the polymer.

The Haake mixer chamber described in Example 1 is preheated to 140° C. metal temperature, and the torque reading is zeroed with the rotation speed at 50 rpm. Sixty grams of polymer are poured into the feed port of the chamber over a 3–4 minute period as the material is drawn into the chamber by the rotors. When all the polymer is charged, the ram is lowered into the feed port, closing the chamber. A slow nitrogen purge is blown across the top of the closed feed port to minimize exposure to oxygen. At 10 minutes from the start of the polymer addition, the torque reading has reached a steady state, and the metal temperature control set point is increased to 220° C. The start of the isothermal torque readings (time equal to zero minutes) is set at the moment when the metal temperature reaches the 220° C. set point. The melt temperature and torque readings are recorded for 10 minutes. At 10 minutes from time zero, the torque has increased 522% and the material has gelled. The relative change in the torque reading at 10 minutes from time zero is recorded in Table 1.

B. Barrier Testing

A film suitable for oxygen transmission rate ($O_2TR$) determination is prepared by pressing approximately 1.2 grams of polymer at 10,000 pounds pressure in a Tetrahedron Associates, Inc., MTP press at 195° C. for 5 minutes. The resulting film is 3.96 mils average thickness and 4–6 inches in diameter. The $O_2TR$ of the film is tested following ASTM D3985-81 method on an Ox Tran 10/50 at 24° C., a relative humidity of 63% on the oxygen side of the film and 63% on the nitrogen side. The $O_2TR$ result is 0.87 (cc×mil)/ ($100\ in^2 \times day \times atm\ O_2$), and is listed in Table 4.

EXAMPLE 4

The Haake mixer chamber described in Example 1 is preheated to 140° C. metal temperature, and the torque reading is zeroed with the rotation speed at 50 rpm. The polymer produced in Comparative Example A, 58.93 grams, is poured into the feed port of the chamber over a 3–4 minute period as the material is drawn into the chamber by the rotors. As the last of the polymer is charged to the chamber, 1.066 grams of 2-(2-aminoethylamino)ethanol (AEEA) are also charged. When all the polymer and amine are charged, the ram is lowered into the feed port, closing the chamber. A slow nitrogen purge is blown across the top of the closed feed port to minimize exposure to oxygen. At 20 minutes from the start of the polymer addition, the materials are homogeneously mixed, and the metal temperature control set point is increased to 220° C. The start of the isothermal torque readings (time equal to zero minutes) is set at the moment when the metal temperature reaches the 220° C. set point. The melt temperature and torque readings are recorded for 100 minutes. At 10 minutes from time zero, the torque has decreased 11%, and at 30 minutes the torque has decreased 34%. The relative changes in the torque readings at 10 minutes and 30 minutes from time zero are recorded in Table 2.

EXAMPLES 5–25

Several PHAE polymers are prepared following the procedure described in Example 4, except that the additives charged to the Haake mixer chamber are those described in Table 2. The relative changes in the torque readings at 10 minutes and 30 minutes from time zero are recorded in Table 2.

EXAMPLE 26

The Haake mixer chamber described in Example 1 is preheated to 150° C. metal temperature, and the torque reading is zeroed with the rotation speed at 50 rpm. Fifty grams of polymer which is prepared in a manner similar to Example 1 and which is the polymerization product of LER and MEA, and in which 0.5 wt. % diethanolamine is blended, are poured into the feed port of the chamber over a 3–4 minute period as the material is drawn into the chamber by the rotors. Time equal to zero minutes is set at the end of the addition of the polymer. At 5 minutes from time zero, 0.7615 grams of calcium ethylhexanoate are charged. At 10 minutes from time zero, the torque reading has reached a steady state, and the metal temperature control set point is manually increased 5° C. at 2-minute intervals to 230° C. The melt temperature and torque readings are recorded for 50 minutes. As the polymer is warmed, the torque reading drops with decreasing viscosity until cross-linking results in a minimum torque at 47 minutes, after which the torque values increase with increasing gelation. The time at minimum torque is recorded in Table 3.

EXAMPLES 27–30

Several PHAE polymers are prepared and evaluated following the procedure described in Example 26, except that at 5 minutes from time zero, the additives described in Table 3 are charged to the Haake mixer chamber. The time at minimum torque is recorded in Table 3.

EXAMPLE 31
A. Preparation of PHAE Polymer

The mixer chamber described in Example 1 is preheated to 140° C. metal temperature, and the torque reading is zeroed with the rotation speed at 50 rpm. The polymer produced in Comparative Example A, 58.8 grams, is poured into the feed port of the chamber over a 3–4 minute period as the material is drawn into the chamber by the rotors. As the last of the polymer is charged to the chamber, 1.221 grams of AEEA are also charged. When all the polymer and amine are charged, the ram is lowered into the feed port, closing the chamber. At 20 minutes from the start of the polymer addition, the materials are homogeneously mixed, and the blend is recovered from the mixer chamber.

B. Barrier Testing

A film suitable for $O_2TR$ determination is prepared by pressing approximately 1.2 grams of polymer at 10,000 pounds pressure using the press described in Comparative Example A. The resulting film is 3.10 mils in thickness and 4–6 inches in diameter. The $O_2TR$ of the film is tested using the same equipment and procedure as described in Comparative Example A at 24° C., a relative humidity of 63% on the oxygen side of the film and 63% on the nitrogen side. The $O_2TR$ result is 0.73 $(cc \times mil)/(100\ in^2 \times day \times atm\ O_2)$, and is listed in Table 4.

EXAMPLES 32–36

Several PHAE polymers are prepared and evaluated following the procedure described in Example 31, except that the additives charged to the Haake mixer chamber are those described in Table 4. The $O_2TR$ results are listed in Table 4.

TABLE 1

| Example | Additive | Additive Wt. % | Change in torque at 10 min. | Change in torque at 30 min. |
|---|---|---|---|---|
| Comparative Example A | — | — | 522% | Gel |
| Example 1 | Diethanolamine (DEA) | 2.00% | −10% | −17% |
| Example 2 | Triethylenetetraamine-propylene oxide adduct (TETA-PO) | 2.00% | 5% | −19% |
| Example 3 | polyethyleneamine | 2.00% | 3% | −31% |

TABLE 2

| Example | Additive | Additive wt., g | Polymer wt., g | Additive Wt. % | Change in torque at 10 min. | Change in torque at 30 min. |
|---|---|---|---|---|---|---|
| Example 4 | 2-(2-aminoethylamino)ethanol (AEEA) | 1.066 | 58.93 | 1.78% | −11% | −34% |
| Example 5 | Glycine | 1.159 | 58.84 | 1.93% | 99% | 824% |
| Example 6 | Glycine sodium salt | 1.694 | 58.31 | 2.82% | −31% | −50% |
| Example 7 | Sodium benzoate | 1.110 | 58.89 | 1.85% | 10% | 21% |
| Example 8 | Potassium benzoate | 1.237 | 58.76 | 2.06% | −4% | 317% |
| Example 9 | Ammonium benzoate | 1.074 | 58.93 | 1.79% | 392% | Gel |
| Example 10 | Potassium citrate, monohydrate | 3.229 | 56.77 | 5.38% | 62% | 183% |
| Example 11 | Potassium citrate, aqueous | 3.226 | 56.77 | 5.38% | −46% | −70% |
| Example 12 | Magnesium oxide | 1.380 | 58.62 | 2.30% | 234% | Gel |
| Example 13 | Potassium hydroxide | 0.502 | 59.50 | 0.84% | −58% | −44% |
| Example 14 | Mercaptopropanediol | 0.844 | 59.16 | 1.41% | 45% | 490% |
| Example 15 | 1,5-Diazabicyclo(5.4.0) undec-7-ene (DBU) | 1.174 | 58.83 | 1.96% | −24% | −41% |
| Example 16 | 2-Methylimidazol | 2.482 | 57.52 | 4.14% | −3% | 28% |
| Example 17 | Aminopropanediol | 1.399 | 58.60 | 2.33% | −15% | −31% |
| Example 18 | Hydroxyethylpiperazine | 1.019 | 58.98 | 1.70% | −14% | −20% |
| Example 19 | Triethylenediamine | 1.730 | 58.27 | 2.88% | 252% | Gel |
| Example 20 | Jeffamine T-403 polyetheramine | 1.140 | 58.86 | 1.90% | 82% | 713% |
| Example 21 | Aminoethylpiperazine | 1.322 | 58.68 | 2.20% | −20% | −32% |
| Example 22 | Diethylenetriamine (DETA) | 0.642 | 59.36 | 1.07% | −5% | −14% |
| Example 23 | Triethylenetetramine (TETA) | 0.753 | 59.25 | 1.26% | −4% | −19% |
| Example 24 | Tetraethylenepentamine (TEPA) | 0.847 | 59.15 | 1.41% | 1% | −20% |

TABLE 2-continued

| Example | Additive | Additive wt., g | Polymer wt., g | Additive Wt. % | Change in torque at 10 min. | Change in torque at 30 min. |
|---|---|---|---|---|---|---|
| Example 25 | Adduct of TEPA and 3 moles of propylene oxide (TEPA-3PO) | 3.141 | 56.86 | 5.23% | −13% | −39% |

TABLE 3

| Example | Extruder-blended Additive | Additive Wt. % | Haake-blended Additive | Additive Wt. % | Time at minimum torque, min. |
|---|---|---|---|---|---|
| Example 26 | DEA | 0.5 | Calcium ethylhexanoate | 1.50 | 47 |
| Example 27 | DEA | 0.5 | — | — | 31 |
| Example 28 | DEA | 0.5 | Copper ethylhexanoate | 7.90 | 37 |
| Example 29 | DEA | 0.5 | Calcium propionate | 4.33 | 39 |
| Example 30 | DEA | 0.5 | Copper acetate | 4.22 | 33 |

TABLE 4

| Example | Additive | Additive Wt. % | $O_2TR$* | Average Temperature, °C. | Relative Humidity % ($N_2$) | Relative Humidity % ($O_2$) | Average Thickness, mils |
|---|---|---|---|---|---|---|---|
| Comparative Example A | — | — | 0.87 | 24 | 63 | 63 | 3.96 |
| Example 31 | polyethylene-polyamine | 2.03% | 0.60 | 22 | 49 | 54 | 3.58 |
| Example 32 | TETA-PO | 1.99% | 0.65 | 24 | 63 | 64 | 3.15 |
| Example 33 | AEEA | 2.04% | 0.73 | 24 | 63 | 63 | 3.10 |
| Example 34 | TETA | 1.20% | 0.65 | 24 | 63 | 63 | 3.17 |
| Example 35 | TEPA | 2.02% | 0.57 | 22 | 49 | 55 | 3.27 |
| Example 36 | DEA | 2.01% | 0.64 | 22 | 49 | 55 | 3.12 |

*$O_2TR = (cc \times mils)/(100 \ in^2 \times day \times atm \ O_2)$

What is claimed is:

1. A composition comprising a blend of an inorganic base, an organic base, a monofunctional organic nucleophile or a multifunctional organic nucleophile and a thermoplastic hydroxy-functionalized polyetheramine having the formula:

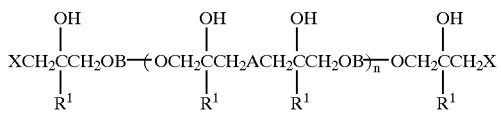

wherein each A is independently an amine moiety and each B is independently a divalent hydrocarbylene or heterohydrocarbylene moiety; $R^1$ is hydrogen or a hydrocarbyl moiety; each X is independently a monovalent moiety; and n is a whole number from about 5 to about 1000.

2. The composition of claim 1 wherein A in the formula of the polyetheramine is represented by any one of the formulas:

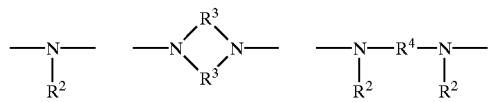

wherein each $R^2$ is independently a hydrocarbyl, heterohydrocarbyl, inertly-substituted hydrocarbyl or inertly-substituted heterohydrocarbyl moiety, wherein the substituent(s) is hydroxyl, cyano, halo, arlyloxy, alkylamido, arylamido, alkylcarbonyl, or arylcarbonyl; $R^3$ and $R^4$ are independently a hydrocarbylene, heterohydrocarbylene, inertly-substituted hydrocarbylene or inertly-substituted heterohydrocarbylene moiety, wherein the substituent(s) is alkylamido, hydroxy, alkoxy, halo, cyano, aryloxy, alkylcarbonyl or arylcarbonyl.

3. The composition of claim 2 wherein X in the formula of the polyetheramine is independently hydrogen, a primary, secondary or tertiary amino moiety, a glycidyloxy moiety, a hydroxyl moiety, an alkyl, heteroalkyl, inertly-substituted alkyl or inertly-substituted heteroalkyl group, an aryl or inertly-substituted aryl group; an alkoxy or inertly-substituted alkoxy group; an aryloxy or inertly-substituted aryloxy group; an alkanethio or inertly-substituted alkanethio group; an arenethio or inertly-substituted arenethio group; wherein the substituent(s) is hydroxyl, cyano, halo, arlyloxy, alkylamido, arylamido, alkylcarbonyl, or arylcarbonyl.

4. The composition of claim 2 wherein X in the formula of the polyetheramine is independently represented by any one of the formulas:

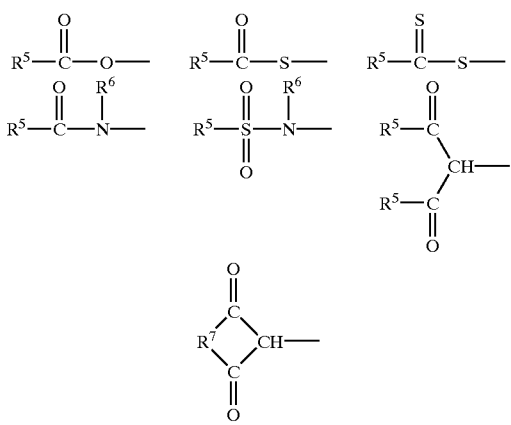

wherein $R^5$ is independently an alkyl or heteroalkyl, inertly-substituted alkyl or heteroalkyl, aryl or inertly-substituted aryl group, wherein the substituent(s) is cyano, halo, alkyl, aryl, alkoxy, arlyloxy, alkylamido, arylamido, alkylcarbonyl, or arylcarbonyl; $R^6$ is independently hydrogen, an alkyl or heteroalkyl, inertly-substituted alkyl or heteroalkyl, aryl or inertly-substituted aryl group, wherein the substituent(s) is the same as that for $R^5$; and $R^7$ is an alkylene or heteroalkylene, inertly-substituted alkylene or heteroalkylene, arylene or inertly-substituted arylene moiety, wherein the substituent(s) is the same as that for $R^3$ and $R^4$.

5. The composition of claim 3 wherein X in the formula of the polyetheramine is 2-hydroxyethylamino, dimethylamino, diethylamino, piperadino, N-(2-hydroxyethyl)piperazino, methoxy, ethoxy, propoxy, 2-(methoxy)ethoxy, 2-(ethoxy)ethoxy, benzyloxy, phenyloxy, p-methylphenyloxy, p-methoxyphenoxy, 4-tert-butylphenyloxy, methylmercapto, ethylmercapto, propylmercapto, 2-(methoxy)ethylmercapto, 2-(ethoxy)ethylmercapto, benzylmercapto, 2,3-dihydroxypropylmercapto, phenylmercapto, p-methylphenylmercapto, acetate, benzoate, acetamido or benzenesulfonamido.

6. The composition of claim 2 wherein in the formula of the polyetheramine, $R^1$ is hydrogen or methyl; $R^2$ is methyl, ethyl, propyl, isopropyl, 2-hydroxyethyl, 3-hydroxypropyl, 2-hydroxypropyl, 2,3-dihydroxypropyl, 2-(acetamido)ethyl, benzyl, phenyl, p-methoxyphenyl, p-methylphenyl; $R^3$ is ethylene, 1,2-propylene or 1,2-butylene; and $R^4$ is ethylene, 1,2-propylene or 1,2-butylene, propylene, butylene, hexamethylene, 1,4-xylylene, 1,3-xylylene, 1,4-phenylene, 1,3-phenylene or 1,2-phenylene.

7. The composition of claim 2 wherein B in the formula of the polyetheramine is 1,4-phenylene, 1,3-phenylene, 1,2-phenylene, methylenediphenylene, isopropylidenediphenylene, oxydiphenylene, thiodiphenylene, carbonyldiphenylene, diphenylflourene or α-methylstilbene or a combination thereof.

8. The composition of claim 1 wherein the polyetheramine is the reaction product of a diglycidyl ether, a difunctional amine and optionally a monofunctional nucleophile.

9. The composition of claim 1 containing an organic nucleophile which is a monofunctional nucleophile.

10. The composition of claim 9 wherein the monofunctional nucleophile is an amine, a hydroxyarene, an aryloxide salt, a carboxylic acid, a carboxylic acid salt, a thiol or a thiolate salt.

11. The composition of claim 10 wherein the amine is dimethylamine, diethylamine, bis(2-hydroxyethyl)amine, diphenylamine, piperadine, N-(2-hydroxyethylpiperazine) or 2-methylimidazole; the hydroxyarene is phenol, cresol, methoxyphenol, or 4-tert-butylphenol; the aryloxide salt is sodium or potassium phenate; the carboxylic acid is acetic acid or benzoic acid; the carboxylic acid salt is sodium acetate, potassium acetate, calcium acetate, copper (II) acetate, sodium propionate, potassium propionate, calcium propionate, sodium benzoate, potassium benzoate, sodium ethylhexanoate, potassium ethylhexanoate, or calcium ethylhexanoate; the thiol is 3-mercapto-1,2-propanediol or benzenethiol; and the thiolate salt is sodium or potassium benzenethiolate.

12. The composition of claim 1 containing an organic nucleophile which is a multifunctional nucleophile.

13. The composition of claim 12 wherein the multifunctional nucleophile is a multifunctional amine, a multifunctional carboxylic acid, a multifunctional carboxylic acid salt, a multifunctional phenol, a multifunctional phenate salt, a multifunctional thiol, a multifunctional thiolate salt, an amino acid or an amino acid salt.

14. The composition of claim 13 wherein the multifunctional amine is ethylenediamine, propylenediamine, butylenediamine, diethylenetriamine, triethylenetetraamine, tetraethylenepentaamine, or polyethylenepolyamine; the multifunctional carboxylic acid is citric acid; the multifunctional carboxylic acid salt is sodium or potassium citrate; the amino acid is glycine; and the amino acid salt is sodium or potassium glycinate.

15. The composition of claim 1 containing an organic nucleophile which is the product of the reaction of a polyethylenepolyamine with ethylene oxide or propylene oxide or a mixture of such products.

16. The composition of claim 1 containing an inorganic base which is potassium hydroxide, sodium hydroxide, ammonium hydroxide, calcium oxide, or magnesium oxide.

17. The composition of claim 1 containing an organic base which is triethylenediamine or 1,5-diazabicyclo(5.4.0)undec-7-ene.

18. The composition of claim 1 containing an inorganic base, organic base or organic nucleophile which is present in an amount of 0.1 to 15.0 weight percent based on the weight of the composition.

19. A process for preparing the composition of claim 1 which comprises contacting an inorganic base, an organic base, a monofunctional organic nucleophile or a multifunctional organic nucleophile with a polyetheramine by adding the inorganic base, organic base, monofunctional organic nucleophile or multifunctional organic nucleophile to the polyetheramine in a molten state.

20. A process for preparing the composition of claim 1 which comprises contacting an inorganic base, an organic base, a monofunctional organic nucleophile or a multifunctional organic nucleophile with a polyetheramine by mixing the inorganic base, organic base, monofunctional organic nucleophile or multifunctional organic nucleophile with the polyetheramine in an extruder.

21. A process for preparing the composition of claim 1 which comprises contacting an inorganic base, an organic base, a monofunctional organic nucleophile or a multifunctional organic nucleophile with a polyetheramine by co-dissolving the inorganic base, organic base, monofunctional organic nucleophile or multifunctional organic nucleophile with the polyetheramine in a solvent and removing the solvent by evaporation.

22. A process for preparing the composition of claim 1 which comprises first reacting a difunctional amine, a diglycidyl ether and optionally a monofunctional nucleophile, and blending the reaction product in situ with an inorganic base, an organic base, a monofunctional organic nucleophile or a multifunctional organic nucleophile in a molten state.

23. The process of claim 22 wherein the difunctional amine, diglycidyl ether and the optional monofunctional nucleophile are first reacted, and then blended in situ with the inorganic base, organic base, monofunctional organic nucleophile or multifunctional organic nucleophile in an extruder.

24. The composition of claim 1 in the form of a solvent borne coating, a waterborne coating, a laminate, a foam, a film, a container or a molded article.

25. A multilayer structure comprising alternating layers of a polyester, polyamide, polyolefins or polymers based on monovinyl aromatic monomers and the composition of claim 1.

26. The structure of claim 25 wherein the polyester is poly(ethylene terephthalate) or poly(ethylene naphthalenedicarboxylate).

27. The structure of claim 25 in the form of an extruded film, an extrusion blown film, an extruded sheet, a thermoformed container or an injection or extrusion blow-molded bottle or container.

* * * * *